US008333132B2

(12) United States Patent
Shimoda et al.

(10) Patent No.: US 8,333,132 B2
(45) Date of Patent: Dec. 18, 2012

(54) CARBIDE ROTARY TOOL

(75) Inventors: Youichiroh Shimoda, Toyokawa (JP); Mikio Fukuda, Toyokawa (JP)

(73) Assignee: OSG Corporation, Toyokawa (JP)

( * ) Notice: Subject to any disclaimer, the term of this patent is extended or adjusted under 35 U.S.C. 154(b) by 399 days.

(21) Appl. No.: 12/810,394

(22) PCT Filed: Dec. 27, 2007

(86) PCT No.: PCT/JP2007/075100
§ 371 (c)(1),
(2), (4) Date: Jun. 24, 2010

(87) PCT Pub. No.: WO2009/084081
PCT Pub. Date: Jul. 9, 2009

(65) Prior Publication Data
US 2010/0290845 A1   Nov. 18, 2010

(51) Int. Cl.
*B21K 5/04* (2006.01)
*B23B 51/02* (2006.01)
*B23C 5/10* (2006.01)
(52) U.S. Cl. .................... 76/108.6; 76/108.1
(58) Field of Classification Search ................. 76/108.1, 76/108.6; 407/32
See application file for complete search history.

(56) References Cited

U.S. PATENT DOCUMENTS

| 4,887,496 | A | | 12/1989 | Kobayashi |
| 5,074,025 | A | * | 12/1991 | Willard, III ............... 29/505 |
| 5,598,751 | A | * | 2/1997 | Ochayon et al. ............ 76/108.6 |
| 5,716,170 | A | * | 2/1998 | Kammermeier et al. ..... 408/145 |
| 5,899,624 | A | | 5/1999 | Thompson |
| 5,899,642 | A | | 5/1999 | Berglow et al. |
| 6,058,807 | A | * | 5/2000 | Fujii et al. ................. 76/108.6 |
| 6,572,311 | B2 | * | 6/2003 | Vasudeva ..................... 408/226 |
| 6,860,172 | B2 | * | 3/2005 | Hecht ......................... 76/108.6 |
| 7,841,259 | B2 | * | 11/2010 | Smith et al. ................. 76/108.2 |
| 7,980,795 | B2 | * | 7/2011 | Berglow et al. ............. 409/234 |
| 2002/0081164 | A1 | | 6/2002 | Pokolm |
| 2010/0290849 | A1 | * | 11/2010 | Mirchandani ............... 408/144 |

FOREIGN PATENT DOCUMENTS

DE  3208282 A1  10/1982
(Continued)

OTHER PUBLICATIONS

International Preliminary Report on Patentability issued in International Application No. PCT/JP2007/075100 filed Dec. 27, 2007.
Written Opinion of the International Searching Authority issued in International Application No. PCT/JP2007/075100 mailed on Apr. 8, 2008 (with partial Translation).
Jul. 3, 2012 Office Action issued in Japanese Patent Application No. 2009-547825 (with translation).

(Continued)

*Primary Examiner* — Hwei C Payer
(74) *Attorney, Agent, or Firm* — Oliff & Berridge, PLC

(57) ABSTRACT

A cutting edge portion intermediate form that is a pre-sintered body of the cutting edge portion and a supporting portion intermediate form that is a fully sintered body of the supporting portion are manufactured separately. Full sintering is then performed where front end portion of the supporting portion intermediate form is inserted into an insertion hole of the cutting edge portion intermediate form. During sintering, cobalt particles in powdered materials are converted into a liquid phase, and contracting occurs. Because the supporting portion intermediate form has already been fully sintered, only the cutting edge portion intermediate form contracts. The front end portion of the supporting portion intermediate form is squeezed by the cutting edge portion intermediate form. The carbide tip is therefore created in which the cutting edge portion and the supporting portion are strongly bonded.

8 Claims, 7 Drawing Sheets

FOREIGN PATENT DOCUMENTS

| | | |
|---|---|---|
| DE | 3830590 A1 | 9/1989 |
| DE | 69729945 T2 | 12/2004 |
| IL | 62342 A | 10/1981 |
| JP | A-59-175912 | 10/1984 |
| JP | A-02-071915 | 3/1990 |
| JP | A-2001-500801 | 1/2001 |
| JP | A-2003-501279 | 1/2003 |
| JP | A-2005-319751 | 11/2005 |
| JP | U-3132125 | 5/2007 |
| JP | 2009-154251 * | 7/2009 |

OTHER PUBLICATIONS

Office Action dated Apr. 19, 2012 issued in German Patent Application 11 2007 003 740.7 (with translation).
Office Action dated Jun. 24, 2011 issued in Chinese Patent Application No. 200780102089.0 (with translation).
Office Action dated Dec. 31, 2011 issued in Chinese Patent Application No. 200780102089.0 (with translation).
international Search Report issued in Application No. PCT/JP2001/075100; Mailed on Apr. 8, 2008 (With Translation).

* cited by examiner

US 8,333,132 B2

CARBIDE ROTARY TOOL

CROSS REFERENCE TO RELATED APPLICATIONS

The disclosure of PCT/JP2007/075100 filed on Dec. 27, 2007, including the specification, drawings and abstract, is incorporated herein by reference in its entirety.

BACKGROUND

1. Field of the Invention

The present invention relates to a carbide rotary tool, and specifically relates to a carbide rotary tool that is made from cemented carbide.

2. Description of Related Art

A so-called "throw-away type" cutting tool is known for which a detachable tip that has a cutting edge portion can be mounted on an end of a rod. Significant savings can be achieved with the tool, because when the tip becomes worn, only the tip needs to be replaced, and the rod can be reused. For example, a tungsten steel cutting blade structure is known in which a threaded shaft that is provided in a bottom portion of a tool bit (a tip) is screwed into a female threaded portion that is provided in the end of a rod (refer to Patent Document 1, for example). For a tool that has this sort of structure, in a case where the tool bit is manufactured from cemented carbide, for example, the cutting edge portion and the threaded shaft are manufactured by being cut from a (solid) piece of the cemented carbide.

Patent Document 1: Japanese Registered Utility Model No. 3132125

SUMMARY

However, the toughness of the threaded shaft that is manufactured from the cemented carbide piece may be low, and a portion near a position where the thread starts may be particularly thin and susceptible to breaking. The threaded shaft may therefore break during one of the insertion and the cutting. Accordingly, a method has been conceived in which the cutting edge portion and the threaded shaft are separately manufactured with different hardnesses, and then are joined to one another by brazing. However, because the cutting edge portion and the threaded shaft have different hardnesses, the integrity of the joint may be reduced, and when the tool is used in machining, the stability and precision may be reduced due to the different hardnesses. Furthermore, because brazing is a technology that requires skill, brazing may not be desirable in the present circumstances, where shortening and simplification of the manufacturing process are required.

The present disclosure is made to solve the problems that are described above, and it is an object of the present disclosure to provide a carbide rotary tool for which pieces of cemented carbide can be strongly joined.

The present disclosure provides a carbide rotary tool for performing cutting, characterized in that the carbide rotary tool includes a rod-shaped supporting portion and a cutting edge portion that is bonded to a front end of the supporting portion, one of the rod-shaped supporting portion and the cutting edge portion is a sintered body that is made from cemented carbide, the other of the rod-shaped supporting portion and the cutting edge portion is a pre-sintered body that is made from cemented carbide and is pre-sintered at a temperature that is lower than a sintering temperature for the sintered body, and the sintered body and the pre-sintered body are sintered together into a bonded state.

DETAILED DESCRIPTION OF EMBODIMENTS

Hereinafter, a carbide end mill 1 that is an embodiment of the present disclosure will be explained with reference to the drawings. In the explanation that follows, the term "carbide" is short for "cemented carbide", and refers to an alloy of tungsten carbide and cobalt that has been created by powder metallurgy (heating and hardening). Generally, the lower the ratio of the cobalt that is included, the harder and more wear-resistant the alloy is, but the toughness of the alloy diminishes and the alloy becomes more brittle. Conversely, the higher the ratio of the cobalt that is included, the greater the toughness and the bending resistance become, but the wear resistance diminishes.

Figure 1:
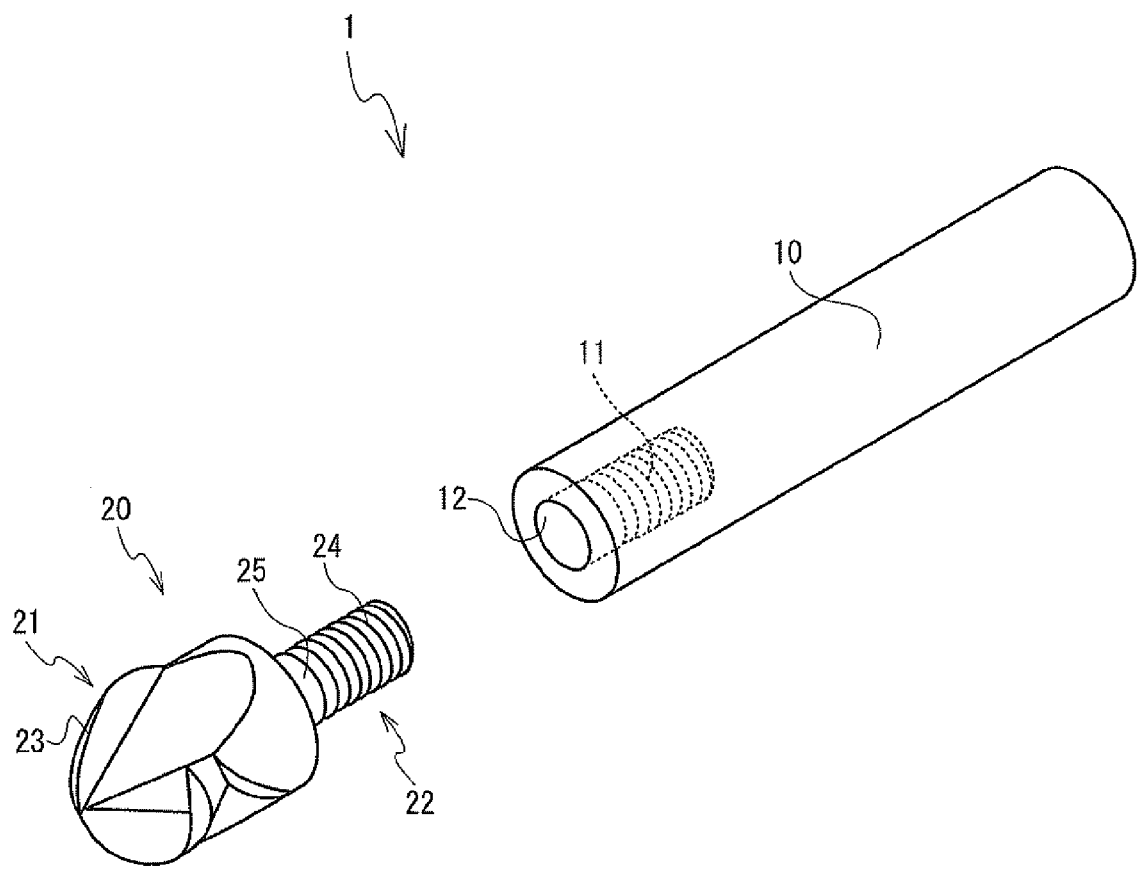
FIG. 1 is an oblique exploded view of a carbide end mill 1.

First, the structure of the carbide end mill 1 will be explained. As shown in FIG. 1, the carbide end mill 1 includes a cylindrical shank 10 and a carbide tip 20 that is screwed into a front end of the shank 10. In other words, the carbide tip 20 is an indexable-type tool that can be replaced in the front end of the shank 10. Further, the shank 10 is generally cast as a single piece from high-speed steel, such as an iron-based alloy. In the front end of the shank 10, a threaded hole 11 is formed that is coaxial with the shank 10 itself, and an inner circumferential face 12, in which female threads are not cut, is formed in the front end side of the shank 10.

Figure 2:
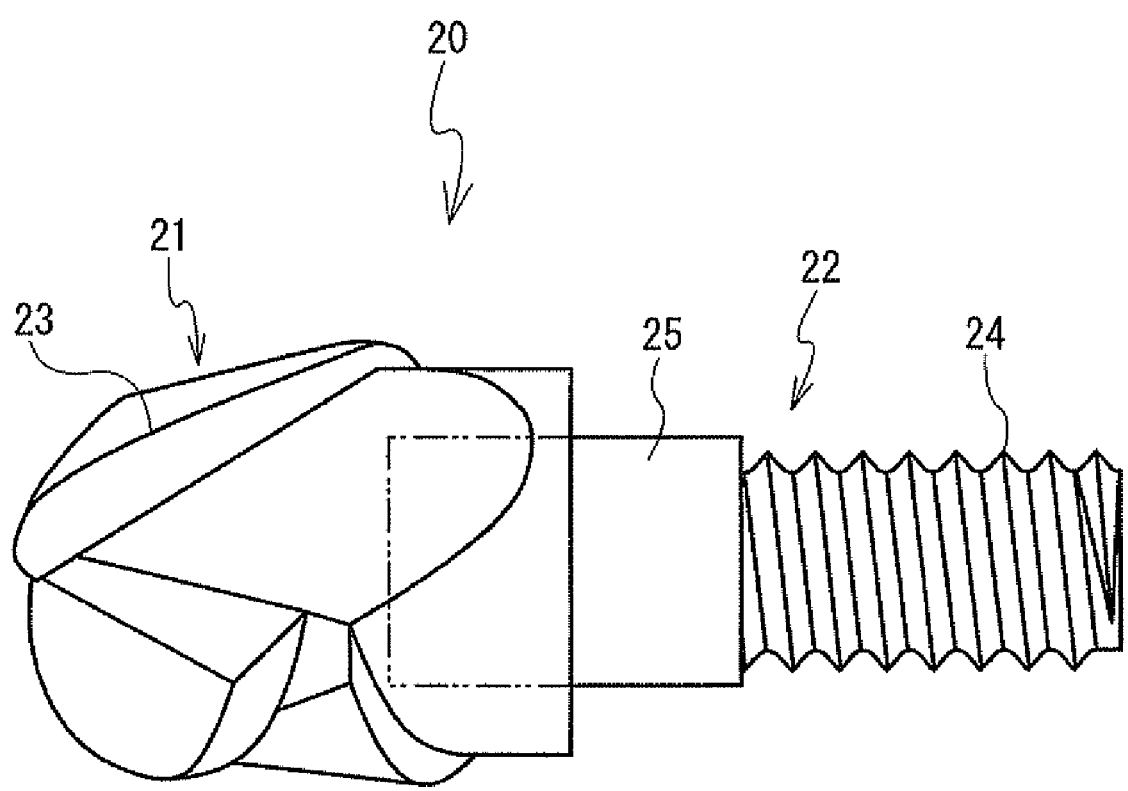
FIG. 2 is a plan view of a carbide tip 20.

In contrast, the carbide tip 20 is made from cemented carbide. The carbide tip 20 is manufactured by a manufacturing process that will be described below. As shown in FIG. 2, the carbide tip 20 includes a cutting edge portion 21, which has a short cylindrical shape with a front end that is formed into a spherical shape, and a rod-shaped supporting portion 22, which protrudes from the center of the bottom surface of the cylindrical shape of the cutting edge portion 21. A cutting edge 23 is created by cutting into the outer surface of the tip of the cutting edge portion 21.

A male thread 24 that may screw into the threaded hole 11 in the shank 10 is formed in the rear end side of an outer circumferential surface of the supporting portion 22. Therefore, when the supporting portion 22 of the carbide tip 20 is screwed into the threaded hole 11 of the shank 10, the male thread 24 of the supporting portion 22 is screwed into the threads in the interior of the threaded hole 11, and an outer circumferential face 25, which is at the front end side of the supporting portion 22 than the male thread 24, slides along the inner circumferential face 12 at the front end side of the threaded hole 11. Thus the carbide tip 20 is strongly affixed to the front end of the shank 10.

Figure 3:
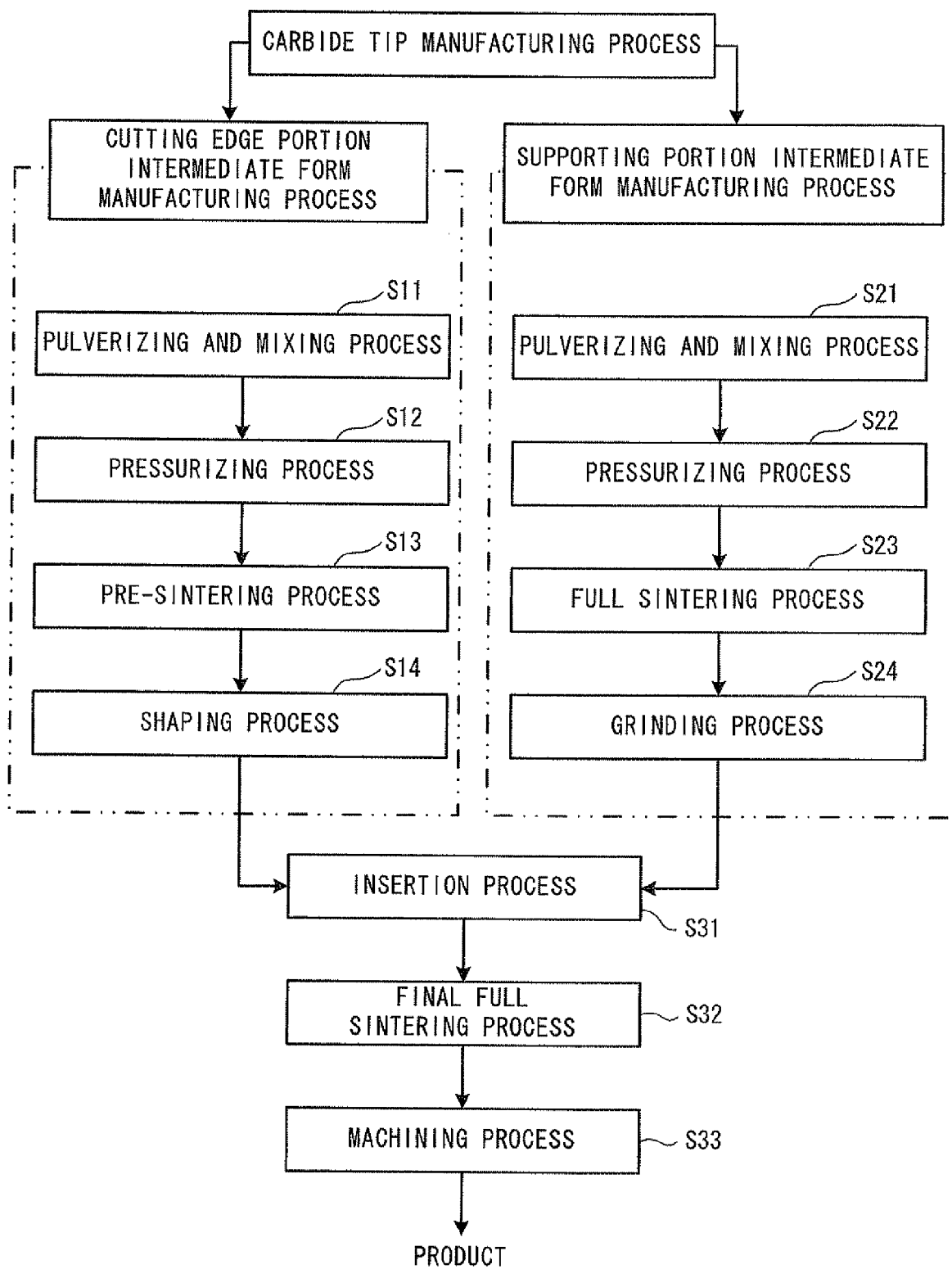
FIG. 3 is a flow of a carbide tip manufacturing process.

Next, the manufacturing process for the carbide tip 20 will be explained. As shown in FIG. 3, in the carbide tip manufacturing process, first, a cutting edge portion intermediate form manufacturing process (Steps S11 to S14), in which a cutting edge portion intermediate form 30 (refer to FIG. 4) that is a pre-sintered body of the cutting edge portion 21 is manufactured, and a supporting portion intermediate form manufacturing process (Steps S21 to S24), in which a supporting portion intermediate form 40 (refer to FIG. 4) that is a fully sintered body of the supporting portion 22 is manufactured, are performed separately. Next, an insertion process (Step S31) is performed in which the front end of the supporting portion intermediate form 40 is inserted into an insertion hole 31 (refer to FIG. 4) that is formed in the cutting edge portion intermediate form 30 and will be described below. Thereafter, a final full sintering process (Step S32) is performed in which a tip intermediate form 50 (refer to FIG. 5), in which the cutting edge portion intermediate form 30 and the supporting portion intermediate form 40 form a single unit, is sintered. Finally, a machining process (Step S33) is performed in which the fully sintered tip intermediate form 50 is machined, so that the final product, the carbide tip 20, is completed. The individual processes will be described in detail below.

The cutting edge portion intermediate form manufacturing process will be described first. As shown in FIG. 3, the cutting edge portion intermediate form manufacturing process includes a pulverizing and mixing process (Step S11), in which carbide powdered materials are mixed together, a pressurizing process (Step S12), in which a specified shape is created by pressurizing the mixed materials, a pre-sintering process (Step S13), in which pre-sintering of the pressurized, shaped part is performed, and a shaping process (Step S14), in which shaping of the pre-sintered, shaped part is performed. The cylindrical cutting edge portion intermediate form 30, which is a pre-sintered body, is manufactured by being passed through this series of processes.

The pulverizing and mixing process (Step S11) will be explained. In the pulverizing and mixing process (Step S11), powdered materials such as tungsten carbide, cobalt, titanium carbide, tantalum carbide, and the like may be used. The powders are blended into a specified composition, then are typically wet pulverized and mixed for anywhere from several hours to several days by a ball mill or the like. In this process, at the same time that the carbide materials are pulverized to a specified particle size, the powders are sufficiently mixed such that the individual constituents are uniformly distributed. In order to improve the mixability of the powdered materials and prevent the oxidation of the powdered materials, an organic solvent such as acetone, alcohol, benzene, carbon tetrachloride, or the like may be used as a solvent for the wet pulverizing and mixing. In a case where a ball mill is used, the conditions are adjusted such that the ratio of the powdered materials to the balls is from 1:1 to 1:3, and the amount of the solvent is from two-hundred to three-hundred milliliters per kilogram of the powdered materials. A lubricant is also added and mixed in to impart formability in the pressurizing process that follows. In the present embodiment, the cobalt content of the cutting edge portion intermediate form 30 is adjusted to nine percent.

Figure 4:
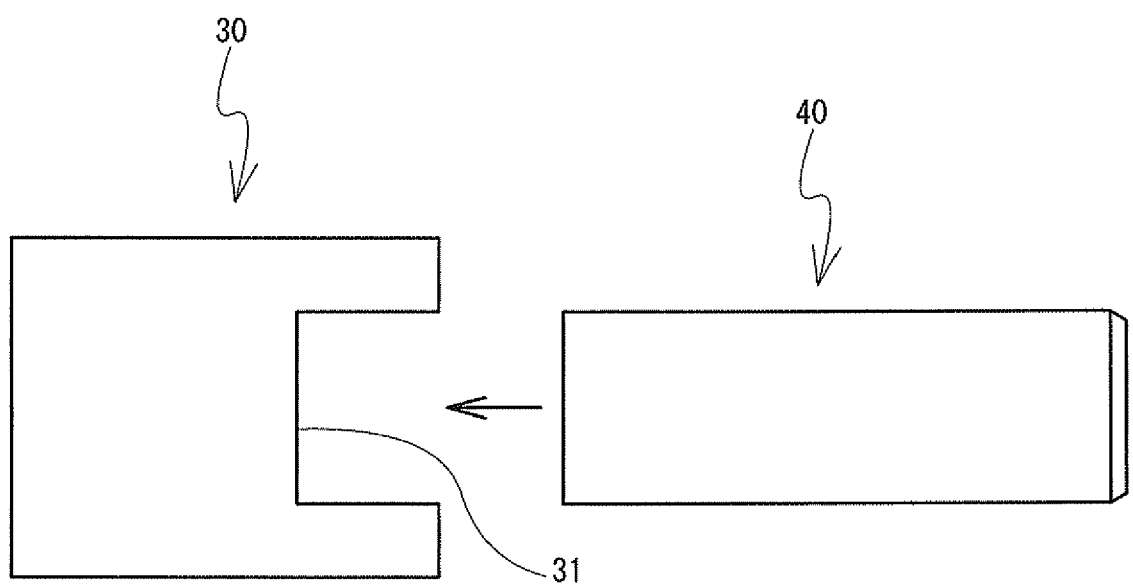
FIG. 4 is a figure that shows a state in which a supporting portion intermediate form 40 is inserted into an insertion hole 31 of a cutting edge portion intermediate form 30 in an insertion process (Step S31)
Figure 5:
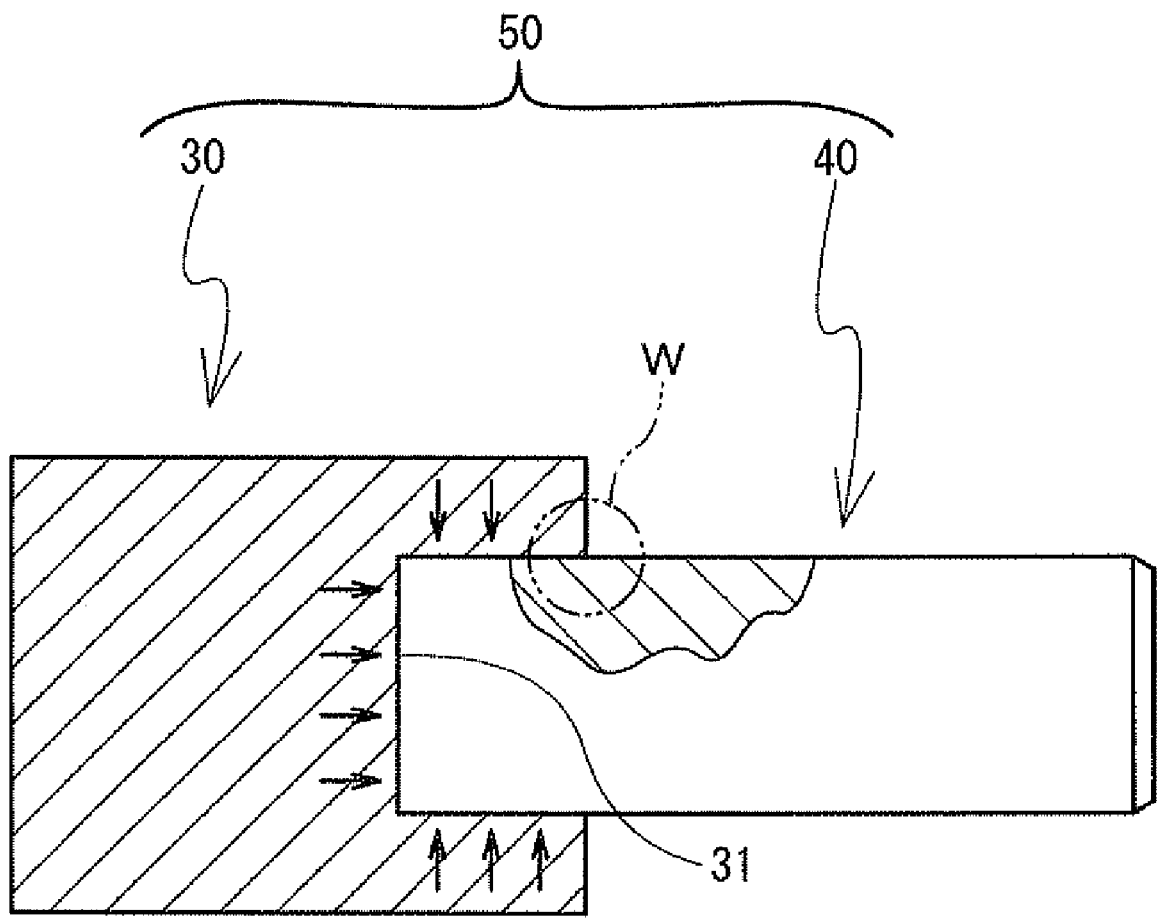
FIG. 5 is a figure that shows a state in which a tip intermediate form 50 is fully sintered in a final full sintering process (Step S32)

The pressurizing process (Step S12) will be explained. In the pressurizing process (Step S12), the cylindrical cutting edge portion intermediate form 30 that is shown in FIG. 4 is created by pressurizing, at a pressure of 20 to 300 MPa, the powdered materials that were mixed in the pulverizing and mixing process (Step S11).

The pre-sintering process (Step S13) will be explained. In the pre-sintering process (Step S13), the pre-sintering of the cutting edge portion intermediate form 30 that was created by pressurizing in the pressurizing process (Step S12) is performed. The pre-sintering is performed at a temperature of 600 to 1000 degrees Celsius. In the pre-sintering, the lubricant that was utilized in the pressurizing process (Step S12) is removed, and sintering of the cobalt particles proceeds to a limited degree. The cutting edge portion intermediate form 30 thus becomes approximately as strong as chalk.

The shaping process (Step S14) will be explained. In the shaping process (Step S14), the shaping of the cutting edge portion intermediate form 30 that was produced by the pre-sintering process (Step S13) is performed. The cylindrical insertion hole 31 is formed in the center of one end face of the cutting edge portion intermediate form 30 by lathe turning, cutting, or the like. One end of the supporting portion intermediate form 40, which will be described below, can be inserted into the insertion hole 31. The series of operations of the cutting edge portion intermediate form manufacturing process is thus completed.

Next, the supporting portion intermediate form manufacturing process will be explained. As shown in FIG. 3, up to a point, the flow of the supporting portion intermediate form manufacturing process is similar to the flow of the cutting edge portion intermediate form manufacturing process that is described above. The supporting portion intermediate form manufacturing process includes a pulverizing and mixing process (Step S21), in which carbide powdered materials are mixed together, a pressurizing process (Step S22), in which a shape is created by pressurizing the mixed materials, a full sintering process (Step S23), in which full sintering of the pressurized supporting portion intermediate form 40 is performed, and a grinding process (Step S24), in which the outer circumferential face is smoothed after the full sintering. The supporting portion intermediate form 40, which is a fully sintered body, is manufactured by being passed through this series of processes.

Next, the points that are different from the cutting edge portion intermediate form process will be explained. First, in the pulverizing and mixing process (Step S21), the cobalt content of the supporting portion intermediate form 40 is adjusted to ten percent. In other words, the cobalt content of the supporting portion intermediate form 40 is higher than the (nine percent) cobalt content of the cutting edge portion intermediate form 30. This is done in order to make it easier to machine the male thread 24 (refer to FIG. 2) on the outer circumferential face of the supporting portion 22 in the machining process (Step S33), which is performed after the final full sintering process (Step S32) and is described below, and to impart an appropriate degree of toughness.

In the pressurizing process (Step S22), the supporting portion intermediate form 40 is pressurized under the same conditions as those in the pressurizing process (Step S12) in the cutting edge portion intermediate form manufacturing process. Further, in the pressurizing process (Step S22), the long cylindrical supporting portion intermediate form 40 is created, as shown in FIG. 4. The outside diameter of the supporting portion intermediate form 40 is adjusted to be slightly greater than the inside diameter of the insertion hole 31, which is formed in the end face of the cutting edge portion intermediate form 30 as described above, after the final full sintering.

Next, after the pressurizing process (Step S22), the full sintering process (Step S23) is performed. The full sintering is performed at a temperature of 1350 to 1550 degrees Celsius, which is higher than the temperature in the pre-sintering. In the full sintering, liquid phase sintering is performed in which the cobalt particles are converted to the liquid phase, and densification of the composition proceeds further. This causes the volume of the supporting portion intermediate form 40 to contract by approximately 20 to 30 percent.

Next, the grinding process (Step S24) will be explained. Grinding of the outer circumference of the supporting portion intermediate form 40 is performed by centerless grinding or the like so that adhesion to the insertion hole 31 can be obtained in the insertion process (Step S31), which is described below. The series of operations of the supporting portion intermediate form manufacturing process is thus completed.

Next, the insertion process (Step S31) will be explained. The insertion process (Step S31) is a process, in which the cutting edge portion intermediate form 30 that was manufactured by the cutting edge portion intermediate form manufacturing process and the supporting portion intermediate form 40 that was manufactured by the supporting portion intermediate form manufacturing process are fitted together to form a single unit, as shown in FIG. 4. Specifically, the tip intermediate form 50 is created by inserting the front end portion of the cylindrical supporting portion intermediate form 40 into the insertion hole 31 that is formed in the end face of the cylindrical cutting edge portion intermediate form 30. The inserting is done in a state where the inside diameter of the insertion hole 31 and the outside diameter of the supporting portion intermediate form 40 are adjusted so as to be fitted together slightly tightly after the final full sintering.

Next, the final full sintering process (Step S32) will be explained. In the final full sintering process (Step S32), the tip intermediate form 50 that was created in the insertion process (Step S31) as shown in FIG. 4 is fully sintered. The preferable full sintering temperature is 1350 to 1550 degrees Celsius, the same as in the full sintering process (Step S23) that is described above. At this time, a phenomenon like that described below occurs in the cutting edge portion intermediate form 30 and the supporting portion intermediate form 40.

First, because the pre-sintered cutting edge portion intermediate form 30 has not been fully sintered, liquid phase sintering occurs, in which the cobalt particles in the powdered materials of the cutting edge portion intermediate form 30 are converted to the liquid phase. In contrast, because the supporting portion intermediate form 40 has already been fully sintered, only the cutting edge portion intermediate form 30 contracts. Therefore, the front end portion of the supporting portion intermediate form 40 that was inserted into the insertion hole 31 in the cutting edge portion intermediate form 30 is squeezed by the contracting of the cutting edge portion intermediate form 30. Furthermore, liquid phase sintering of the cobalt particles occurs in the boundary portions of the inner circumferential face of the insertion hole 31 in the cutting edge portion intermediate form 30 and the outer circumferential face of the front end portion of the supporting portion intermediate form 40. In other words, the liquid phase sintering occurs for the cobalt particles of the cutting edge portion intermediate form 30 and the cobalt particles of the supporting portion intermediate form 40.

An electron microscope was used to check the boundary portions of the cutting edge portion intermediate form 30 and the supporting portion intermediate form 40 after the full sintering, in order to survey the degree of bonding in the boundary portions. A scanning electron microscope (SEM) was used as the electron microscope.

Figure 6:
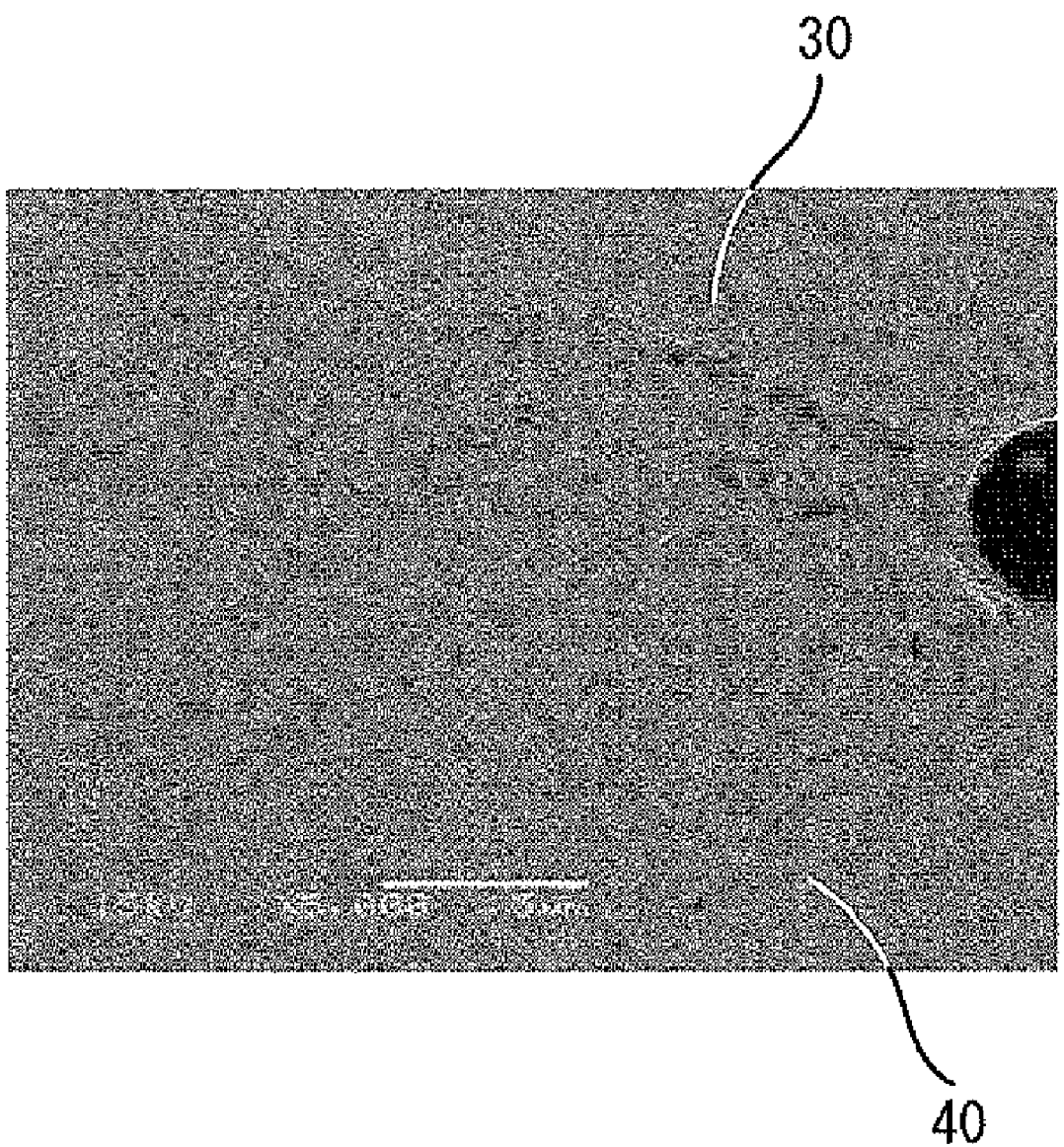
FIG. 6 is an electron microscope photograph (magnified 5,000 times) of an area that is encircled by a dash-and-two-dot line W that is shown in FIG. 5.
Figure 7:
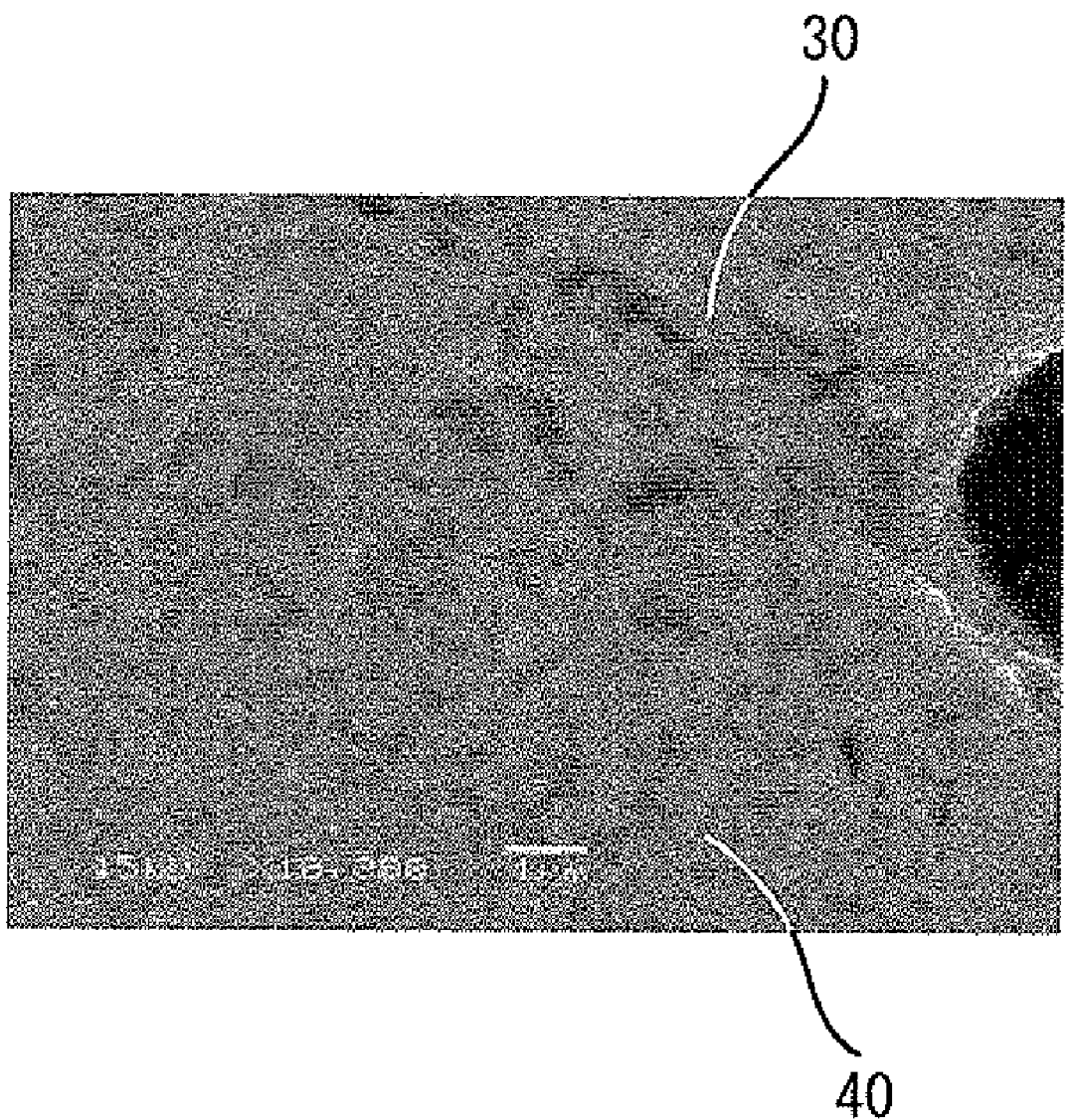
FIG. 7 is an electron microscope photograph (magnified 10,000 times) of the area that is encircled by the dash-and-two-dot line W that is shown in FIG. 5.

As shown in FIG. 6 and FIG. 7, the particle structure of the cutting edge portion intermediate form 30 and the particle structure of the supporting portion intermediate form 40 was completely the same. Moreover, the boundary between the inner circumferential face of the insertion hole 31 in the cutting edge portion intermediate form 30 and the outer circumferential face of the front end portion of the supporting portion intermediate form 40 had completely disappeared. It was thus confirmed that the cutting edge portion intermediate form 30 and the supporting portion intermediate faun 40 had been reliably formed into a single unit. It was therefore proven that a bond can be achieved that is much stronger than that created by the known brazing method.

Finally, the machining process (Step S33) will be explained. In the machining process (Step S33), final machining is performed on the fully sintered carbide tip intermediate form 50 that was created in the final full sintering process (Step S32) to produce the final product. In other words, the cutting edge 23 is created by cutting into the surface of the tip of the cutting edge portion 21, and processes such as cutting the male thread into the outer surface of the rear end side of the supporting portion 22 and the like are performed. The series of operations of the carbide tip manufacturing process is thus completed, and the final product, the carbide tip 20 in which the cutting edge portion 21 and the supporting portion 22 form a single unit, is produced.

As explained above, the carbide tip 20 in the present embodiment is screwed into the front end of the cylindrical shank 10. The material of the carbide tip 20 is cemented carbide. The carbide tip 20 includes a cutting edge portion 21, which has a short cylindrical shape with a front end that is fowled into a spherical shape, and a rod-shaped supporting portion 22, which protrudes from the center of the bottom surface of the cutting edge portion 21. In the carbide tip manufacturing process for manufacturing the carbide tip 20, first, the cutting edge portion intermediate form manufacturing process, in which the cutting edge portion intermediate form 30 that is the pre-sintered body of the cutting edge portion 21 is manufactured, and the supporting portion intermediate form manufacturing process, in which a supporting portion intermediate form 40 that is the fully sintered body of the supporting portion 22 is manufactured, are performed separately. Next, the front end of the supporting portion intermediate form 40 is inserted into the insertion hole 31 that is formed in the cutting edge portion intermediate form 30. Then the tip intermediate form 50, in which the cutting edge portion intermediate form 30 and the supporting portion intermediate form 40 form a single unit, is fully sintered.

At this point, because the cutting edge portion intermediate form 30 has not been fully sintered, the liquid phase sintering occurs in which the cobalt particles in the powdered materials of the cutting edge portion intermediate form 30 are converted to the liquid phase. In contrast, because the supporting portion intermediate form 40 has already been fully sintered, only the cutting edge portion intermediate form 30 contracts. Therefore, the front end portion of the supporting portion intermediate form 40 that was inserted into the insertion hole 31 in the cutting edge portion intermediate form 30 is squeezed by the contracting of the cutting edge portion intermediate form 30. Furthermore, liquid phase sintering of the cobalt particles occurs in the boundary portions of the inner circumferential face of the insertion hole 31 in the cutting edge portion intermediate form 30 and the outer circumferential face of the front end portion of the supporting portion intermediate form 40. This makes it possible for the cutting edge portion intermediate form 30 and the supporting portion intermediate form 40 to be strongly bonded to one another.

Various types of modifications may obviously be made to the present disclosure. For example, the dimensions of the carbide tip 20 that is shown in FIG. 2 are just one example, and dimensions that are different from those in the embodiment that is described above may be used. The composition of the powdered materials for the carbide tip 20 that is shown in the embodiment that is described above is just one example, and a powder other than those may be mixed together.

Furthermore, in the manufacturing processes in the embodiment that is described above, the bonding in the final full sintering process (Step S32) takes advantage of the contracting of the cutting edge portion intermediate form 30 and the liquid phase phenomenon, and in order for the bond strength to be achieved, the supporting portion intermediate form 40 includes a ground face and the relationship between the hole and the shaft is a relationship of tightening by approximately 0.2.

The carbide rotary tool of the present disclosure is not limited to being used for an indexable-type tool that is screwed into the front end of a rod and can be used for a tool that is manufactured as a single unit with the rod.

The invention claimed is:

1. A method of manufacturing a carbide rotary tool that includes a support portion that can be detachably attached to a front end of a rod-shaped shank and a cutting edge portion that is connected to a front end of the support portion, the method comprising the steps of:
   producing a support portion intermediate form that is an intermediate form of the support portion, the support portion intermediate form being cylindrically shaped and defining an end face at a front end of the support portion intermediate form and an outer circumferential surface that that extends along a longitudinal direction of the support portion intermediate form, the support portion intermediate form being made from cemented carbide that has been fully sintered at a first temperature;
   producing a cutting edge portion intermediate form that is an intermediate form of the cutting edge portion, the cutting edge portion intermediate form having a recessed portion that defines a bottom face and an inner circumferential surface, the cutting edge portion intermediate form being made from cemented carbide that has been pre-sintered at a second temperature that is lower than the first temperature;
   inserting the front end of the support portion intermediate form into the recessed portion provided in the cutting edge portion intermediate form; and
   sintering the cutting edge portion intermediate form and the support portion intermediate form together in a state of double face contact in which the end face of the front end of the support portion intermediate form is in direct contact with the bottom face of the recessed portion and the outer circumferential surface of the front end of the support portion intermediate form is in direct contact with the inner circumferential surface of the recessed portion.

2. The method of manufacturing the carbide rotary tool of claim 1, wherein the second temperature at which the cutting edge portion intermediate form is pre-sintered is in the range of 600 to 1000 degrees Celsius.

3. The method of manufacturing the carbide rotary tool of claim 2, wherein the first temperature at which the support portion intermediate form is fully sintered is in the range of 1350 to 1550 degrees Celsius.

4. The method of manufacturing the carbide rotary tool of claim 1, wherein the support portion intermediate form is made from a cemented carbide that is adjusted to have a higher percentage of cobalt than a percentage of cobalt in the cutting edge portion intermediate form.

5. The method of manufacturing the carbide rotary tool of claim 4, wherein a percentage of cobalt in the cemented carbide of the support portion intermediate form is approximately 10 percent, and the percentage of cobalt in the cutting edge portion intermediate form is approximately 9 percent.

6. The method of manufacturing the carbide rotary tool of claim 1, wherein the sintering of the cutting edge portion intermediate form and the support portion intermediate form together in a state of double face contact results in the cutting edge portion intermediate form contracting around the support portion intermediate form.

7. A method of manufacturing a tool that includes a support portion that can be detachably attached to a front end of a rod-shaped shank and a working portion that is connected to a front end of the support portion, the method comprising the steps of:
   producing a support portion intermediate form that is a rod-shaped intermediate form of the support portion, the support portion intermediate form being made from cemented carbide that has been fully sintered;
   producing a working portion intermediate form that is an intermediate form of the working portion, the working portion intermediate form being made from cemented carbide that has been pre-sintered at a temperature that is lower than a sintering temperature for the support portion intermediate form;
   inserting a front end of the support portion intermediate form into a recessed portion provided in the working portion intermediate form; and
   sintering the working portion intermediate form and the support portion intermediate form together in a state of double face contact in which an end face of the front end of the support portion intermediate form is in contact with a bottom face of the recessed portion and an outer circumferential surface of the front end of the support portion intermediate form is in contact with an inner circumferential surface of the recessed portion.

8. A carbide rotary tool that includes a support portion that can be detachably attached to a front end of a rod-shaped shank and a cutting edge portion that is connected to a front end of the support portion, the carbide rotary tool being produced by a method comprising the steps of:
   producing a support portion intermediate form that is an intermediate form of the support portion, the support portion intermediate form being cylindrically shaped and defining an end face at a front end of the support portion intermediate form and an outer circumferential surface that that extends along a longitudinal direction of the support portion intermediate form, the support portion intermediate form being made from cemented carbide that has been fully sintered at a first temperature;
   producing a cutting edge portion intermediate form that is an intermediate form of the cutting edge portion, the cutting edge portion intermediate form having a recessed portion that defines a bottom face and an inner circumferential surface, the cutting edge portion intermediate form being made from cemented carbide that has been pre-sintered at a second temperature that is lower than the first temperature;
   inserting the front end of the support portion intermediate form into the recessed portion provided in the cutting edge portion intermediate form; and sintering the cutting edge portion intermediate form and the support portion intermediate form together in a state of double face contact in which the end face of the front end of the support portion intermediate form is in direct contact with the bottom face of the recessed portion and the outer circumferential surface of the front end of the support portion intermediate form is in direct contact with the inner circumferential surface of the recessed portion.

* * * * *